U.S. Patent Number: 5,254,631
Date of Patent: Oct. 19, 1993

Yamamoto et al.

[54] CATIONICALLY ELECTRODEPOSITABLE FINELY DIVIDED GELLED POLYMERS HAVING A CORE-SHEATH STRUCTURE OBTAINED BY EMULSION POLYMERIZATION

[75] Inventors: Kenji Yamamoto; Haruo Nagaoka; Teiji Katayama; Masafumi Kume, all of Hiratsuka; Tadayoshi Hiraki, Odawara; Eisaku Nakatani, Hiratsuka; Yasuyuki Hirata, Hatano; Haruhiko Kataoka, Hiratsuka, all of Japan

[73] Assignee: Kansai Paint Co., Ltd., Hyogo, Japan

[21] Appl. No.: 766,793

[22] Filed: Sep. 27, 1991

[30] Foreign Application Priority Data

Sep. 28, 1990 [JP] Japan .................. 2-257221
Sep. 28, 1990 [JP] Japan .................. 2-257222

[51] Int. Cl.$^5$ .................... C08F 263/00; C08F 283/00
[52] U.S. Cl. ........................ 525/278; 205/95; 205/317; 525/288; 525/528; 525/530; 525/902
[58] Field of Search ............... 525/278, 528, 530, 902, 525/288

[56] References Cited

FOREIGN PATENT DOCUMENTS

| | | |
|---|---|---|
| 0282000 | 9/1988 | European Pat. Off. . |
| 0295947 | 12/1988 | European Pat. Off. . |
| 2037350 | 2/1990 | Japan . |
| WO82/03397 | 10/1982 | PCT Int'l Appl. . |
| WO86/04343 | 7/1986 | PCT Int'l Appl. . |
| WO88/05060 | 7/1988 | PCT Int'l Appl. . |
| 1444110 | 7/1976 | United Kingdom . |
| 2221689 | 2/1990 | United Kingdom . |

Primary Examiner—Christopher Henderson
Attorney, Agent, or Firm—Wenderoth, Lind & Ponack

[57] ABSTRACT

A cationically electrodepositable finely divided gelled polymer obtained by emulsion-polymerizing, in the presence of a water-soluble or water-dispersible cationic resin, a monomer component (A) comprising (a) a polymerizable unsaturated vinylsilane monomer having a vinylic double bond and a hydrolyzable akloxysilane group, (b) a polymerizable monomer having at least two radically polymerizable unsaturated groups in the molecule, (c) a polymerizable unsaturated monomer having a vinylic double bond and a hydroxyl group, and (d) other polymerizable unsaturated monomer, and a cationically electrodepositable finely divided gelled polymer obtained by emulsion-polymerizing, in the presence of the above finely divided gelled polymer, a monomer component (B) comprising (e) a blocked mono- or polyisocyanate in which the at least one isocyanate group in the molecule is blocked with a radically polymerizable monohydroxy compound, (f) a polymerizable unsaturated monomer having a vinylic double bond and a hydroxyl group, and (g) other polymerizable unsaturated monomer, said cationically electrodepositable finely divided gelled polymer having a core-sheath structure consisting of a core of the polymerization product of the monomer component (A) and a sheath of the polymerization product of the monomer component (B).

11 Claims, No Drawings

CATIONICALLY ELECTRODEPOSITABLE FINELY DIVIDED GELLED POLYMERS HAVING A CORE-SHEATH STRUCTURE OBTAINED BY EMULSION POLYMERIZATION

The present invention relates to cationically electrodepositable finely divided gelled polymers and processes for producing the polymers. More particularly, the present invention relates to an internally cross-linked, cationically electrodepositable finely divided gelled polymer having a hydrolyzable alkoxysilane group and a hydroxyl group, obtained by emulsion polymerization using a water-soluble or water-dispersible cationic resin; to a cationically electrodepositable finely divided gelled polymer having a core-sheath structure consisting of a core component of said internally crosslinked, cationically electrodepositable finely divided gelled polymer and a sheath component having an urethane bond and a hydroxyl group; and to processes for producing cationically electrodepositable finely divided gelled polymers of good polymerization stability by conducting the above emulsion polymerization using a water-soluble azoamide compound as a polymerization initiator.

BACKGROUND OF THE INVENTION

Finely divided polymers gelled by crosslinking reactions in the particles and processes for producing same have been so far widely known. For example, there are a process in which a monomer mixture containing a monomer for crosslinking containing at least two ethylenic double bonds is emulsion polymerized in an aqueous medium (British Patent No. 967,051 and European Patent Application Publication No. 259181A), and a process in which a monomer mixture containing glycidyl (meth)acrylate and (meth)acrylic acid is dispersion polymerized in the presence of a dispersion stabilizer in a non-aqueous medium, and simultaneously these functional groups are reacted (U.S. Pat. No. 4,025,474). Especially, as a process for producing a polymer in an aqueous medium using an alkoxysilane monomer, there are proposed a process in which a mixture of an alkoxy silane monomer and the other monomer is emulsion polymerized in an aqueous medium using a non-reactive surface active agent (European Patent Application Publication No. 153,600A), a process for obtaining a delustered electrodeposition-coated film for aluminum building material in which an alkoxysilane monomer, (meth)acrylic acid and the other monomer are copolymerized and the resulting copolymer is then dispersed in water (Japanese Laid-Open Patent Application No. 67,396/1984), a water-soluble composition obtained by combining an acrylic polymer containing an alkoxy silane group and a carboxyl group with a colloidal silica (Japanese Patent Publication No. 47,178/1986), and a process in which an acrylic copolymer containing an alkoxysilane group and a cationic group is dispersed in water and the dispersed copolymer is subjected to cross-linking in particles (European Patent Application Publication No. 282000A).

The finely divided gelled polymers obtained by the conventional processes are added to a paint composition and influence rheological characteristics and physical characteristics of the paint composition, contributing to improvements in spray efficiency of the paint, prevention of sagging of the coated film and pattern control of a metallic pigment.

Meanwhile, cationically electrodepositable paints that find wide acceptance mainly in automobile industry have per se an excellent corrosion resistance, but the coated film in the edge portion of the coated product does not become thick and is poor in edge covering property; its improvement has been demanded. In order to solve the above problem, the present inventors have made investigations to apply the aforesaid finely divided gelled polymer to the cationically electro-depositable paint. Nevertheless, most of the known finely divided gelled polymers are non-aqueous dispersions or aqueous dispersions of an anionic or nonionic type obtained by emulsion polymerization using a non-reactive surface active agent, and it is usually difficult to apply them to a cationically electrodepositable paint. Even if they are applied to the cationically electro-depositable paint, the stability of electrodeposition coating bath and electrodepositable characteristics as well as the water resistance and corrosion resistance of the coated film are impaired. Accordingly, they cannot endure the practical use in this field.

On the other hand, the present inventors have proposed an internally crosslinked, finely divided gelled polymer having an alkoxysilane group, a hydroxyl group and a cationic group, and a process for producing same (UK Patent Application No. 2,221,689A and DT-OS 3926326). Said internally crosslinked, finely divided gelled polymer has cationically electrodepositable characteristics. Even if said polymer is added to a cationically electrodepositable paint, the stability of bath and electrodepositable characteristics are not impaired. The baked, coated film is excellent in edge covering property but still a bit inferior in corrosion resistance in wet condition and thus unsatisfactory in the practical use.

SUMMARY OF THE INVENTION

The present inventors made investigations in order to develop a cationically electrodepositable finely divided gelled polymer which is useful as a rheology-controlling agent for cationically electrodepositable paint. As a result, the present inventors found that an internally crosslinked, finely divided gelled polymer having an alkoxysilane group, a hydroxyl group and a cationic group and containing an epoxy compound locally on the particle surfaces, obtained by effecting emulsion polymerization using a water-soluble or water-dispersible cationic resin, is very useful for solving the above-mentioned problems.

The present inventors further found that a finely divided gelled polymer having a core-sheath structure consisting of a core component with a hydrolyzable alkoxysilane group and a hydroxyl group and a sheath component with an urethane bond and a hydroxyl group and containing an epoxy compound locally on the particle surfaces, obtained by effecting emulsion polymerization using a water-soluble or water-dispersible cationic resin, has corrosion resistance in wet condition which changes only slightly with the lapse of time.

The present inventors furthermore found that the finely divided gelled polymer is cationically electrodepositable and, when added to a cationically electrodepositable paint, does not impair the bath stability and electrodepositability of the cationically electrodepositable paint and, when the resulting paint is coated and baked, the silanol group formed by the hydrolysis of the alkoxysilane group causes condensation between silanol groups and condensation with the hydroxyl group giving rise to crosslinking between particles and crosslinking with the base resin; and that in the finely divided gelled polymer having a core-sheath structure, the urethane bond in the sheath component causes condensation with the hydroxyl group giving rise to crosslinking between particles and crosslinking with the base resin (part of the silanol group in the core component also takes part in the crosslinking reaction), whereby the resulting coated film of cationically electro-depositable paint has remarkably improved cissing preventability, edge covering property, adhesion and chipping resistance without impairing the water resistance, corrosion resistance and surface smoothness and the edge covering property of the coated film is not reduced with the lapse of time.

DETAILED DESCRIPTION OF THE INVENTION

According to one aspect of the present invention, there is provided a cationically electrodepositable finely divided gelled polymer obtained by emulsion-polymerizing, in the presence of a water-soluble or water-dispersible cationic resin, a monomer component (A) comprising (a) a polymerizable unsaturated vinylsilane monomer having a vinylic double bond and a hydrolyzable alkoxysilane group, (b) a polymerizable monomer having at least two radically polymerizable unsaturated groups in the molecule, (c) a polymerizable unsaturated monomer having a vinylic double bond and a hydroxyl group, and (d) other polymerizable unsaturated monomer [said finely divided gelled polymer is hereinafter referred to as "finely divided gelled polymer (1)"].

According to another aspect of the present invention, there is provided a cationically electro-depositable finely divided gelled polymer obtained by emulsion-polymerizing, in the presence of the above finely divided gelled polymer obtained by emulsion-polymerizing the above monomer component (A) in the presence of a water-soluble or water-dispersible cationic resin, a monomer component (B) comprising (e) a blocked mono- or polyisocyanate in which the at least one isocyanate group in the molecule is blocked with a radically polymerizable monohydroxy compound, (f) a polymerizable unsaturated monomer having a vinylic double bond and a hydroxyl group, and (g) other polymerizable unsaturated monomer, said cationically electrodepositable finely divided gelled polymer having a core-sheath structure consisting of a core of the polymerization product of the monomer component (A) and a sheath of the polymerization product of the monomer component (B) [said finely divided gelled polymer is hereinafter referred to as "finely divided gelled polymer (2)"].

According to still another aspect of the present invention, there is provided a process for producing a cationically electrodepositable finely divided gelled polymer of good polymerization stability, which comprises emulsion-polymerizing, in the presence of a water-soluble or water-dispersible cationic resin, a monomer component (A) comprising (a) a polymerizable unsaturated vinylsilane monomer having a vinylic double bond and a hydrolyzable alkoxysilane group, (b) a polymerizable monomer having at least two radically polymerizable unsaturated groups in the molecule, (c) a polymerizable unsaturated monomer having a vinylic double bond and a hydroxyl group, and (d) other polymerizable unsaturated monomer, which process is characterized by using a water-soluble azoamide compound as a polymerization initiator in the emulsion polymerization.

According to still another aspect of the present invention, there is provided a process for producing a cationically electrodepositable finely divided gelled polymer of good polymerization stability, which comprises emulsion-polymerizing, in the presence of the finely divided gelled polymer obtained by emulsion-polymerizing the above monomer component (A) in the presence of a water-soluble or water-dispersible cationic resin, a monomer component (B) comprising (e) a blocked mono- or polyisocyanate in which the at least one isocyanate group in the molecule is blocked with a radically polymerizable monohydroxy compound, (f) a polymerizable unsaturated monomer having a vinylic double bond and a hydroxyl group, and (g) other polymerizable unsaturated monomer, which process is characterized by using a water-soluble azoamide compound as a polymerization initiator in the emulsion polymerization.

The present invention is hereinafter described in more detail.

Vinylsilane monomer (a)

The vinylsilane monomer (a) includes a compound represented by formula

wherein Q denotes a polymerizable unsaturated group such as a gamma-methacryloxypropyl group or a vinyl group, and R denotes an acetoxy group or an alkoxy group having 1 to 8 carbon atoms.

In formula (I), the "alkoxy group" represented by R is used in a wide sense. Examples of the alkoxy group include ordinary alkoxy groups such as methoxy, ethoxy, propoxy, butoxy, isobutoxy, pentoxy and hexoxy; alkoxyalkoxy groups such as methoxymethoxy and ethoxymethoxy; alkoxyallyloxy groups such as methoxyallyloxy and ethoxyallyloxy; and alkoxyphenoxy groups such as methoxyphenoxy and ethoxyphenoxy. The preferable group of R is the methoxy or ethoxy group. The silane monomer is a monomer known per se and produced similarly to the known monomer. Concrete examples of the silane monomer (a) include vinyltrimethoxysilane, vinyltriethoxysilane, vinyltris(2-methoxyethoxy)silane, gamma-methacryloxy-propyltrimethoxysilane and vinyltriacetoxysilane. Among them, gamma-methacryloxypropyltrimethoxysilane is especially preferable.

Polymerizable monomer (b)

The polymerizable monomer (b) having at least two radically polymerizable unsaturated groups in the molecule includes a polymerizable unsaturated monocarboxylic acid ester of a polyhydric alcohol, a polymerizable unsaturated alcohol ester of a polybasic acid and an aromatic compound replaced with two or more vinyl groups (e.g. divinylbenzene).

Examples of the polyhydric alcohol include alkylene glycols having 2 to 6 carbon atoms and aliphatic polyhydric alcohols having 3 to 6 carbon atoms and at least three hydroxyl groups in a molecule, such as glycerol, trimethylolpropane, pentaerythritol and 1,1,1-tris(hydroxymethyl)alkane.

Examples of the polymerizable unsaturated monocarboxylic acid that forms an ester therewith include acrylic acid, methacrylic acid and crotonic acid.

Examples of the polybasic acid include cyanuric acid, isocyanuric acid, phthalic acid, terephthalic acid, trimellitic acid, trimesic acid and pyromellitic acid. A typical example of the polymerizable unsaturated alcohol is allyl alcohol.

Thus, examples of the polymerizable monomer (b) include ethylene glycol diacrylate, ethylene glycol dimethacrylate, triethylene glycol dimethacrylate, tetraethylene glycohol dimethacrylate, 1,3-butylene glycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxydimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl terephthalate, diallyl phthalate and divinylbenzene.

Polymerizable unsaturated monomer (c)

The polymerizable unsaturated monomer (c) having a vinylic double bond and a hydroxyl group is a monomer component that serves to introduce a hydroxyl group into the finely divided gelled polymer, and the hydroxyl group being introduced acts as a hydrophilic group in producing the finely divided gelled polymer or a functional group in the reaction of crosslinking between dispersed particles. Preferable examples of the unsaturated monomer (c) include $C_2-C_6$ hydroxyalkyl (meth)acrylates such as 2-hydroxyethyl (meth)acrylate and 1-, 2- or 3-hydroxypropyl (meth)acrylate.

Other polymerizable unsaturated monomer (d)

The other polymerizable unsaturated monomer (d) is the rest of the monomer component (A) constituting the finely divided gelled polymer. Examples thereof can be known monomers used to form ordinary acrylic resins, for example, alkyl (preferably $C_1-C_{18}$ alkyl) (meth)acrylates such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and cyclohexyl acrylate; polymerizable unsaturated nitrile monomers such as (meth)acrylonitrile; vinyl aromatic monomers such as styrene, alphamethylstyrene and vinyl toluene; (meth)acrylamide; and (meth)acrylic acid amide derivatives such as (meth)acrylamide N-derivatives. These monomers are properly selected depending on the desirous characteristics and may be used either singly or in combination of two or more.

The proportions of the monomers (a) to (d) constituting the monomer component (A) of the finely divided gelled polymer (1) in the present invention are not strictly limited and can be varied depending upon, for example, the desirous properties of the finely divided gelled polymer formed. Generally, the pro-portions can be within the following range.

| Monomer (a): | 1–30% by weight, preferably 3–20% by weight, more preferably 4–10% by weight |
|---|---|
| Monomer (b): | 1–30% by weight, preferably 3–20% by weight, more preferably 4–10% by weight |
| Monomer (c): | 1–30% by weight, preferably 3–20% by weight, more preferably 4–10% by weight |
| Monomer (d): | 10–97% by weight, preferably 40–91% by weight, more preferably 70–88% by weight |

Blocked mono- or poly-isocyanate (e)

The blocked mono- or poly-isocyanate (e) in which the at least one isocyanate group is blocked with a radically polymerizable monohydroxy compound, said isocyanate (e) constituting the monomer component (B) in the finely divided gelled polymer (2), is an important component to improve the prevention of cissing, the adhesion and the chipping resistance of the cationically electro-deposition-coated film without impairing the water resistance, the corrosion resistance and the coated surface smoothness of the coated film.

Examples of the monoisocyanate in the component (e) include aromatic monoisocyanates such as phenyl isocyanate, p-chlorophenyl isocyanate, o-chlorophenyl isocyanate, m-chlorophenyl isocyanate, 3,4-dichlorophenyl isocyanate and 2,5-dichlorophenyl isocyanate; and aliphatic monoisocyanates such as methyl isocyanate, ethyl isocyanate, n-butyl isocyanate, n-propyl isocyanate and octadecyl isocyanate. These monoisocyanates may be used either singly or in combination of two or more.

Examples of the polyisocyanates used in the blocked polyisocyanates include aromatic polyisocyanates such as toluene diisocyanate, naphthalene diisocyanate, xylylene diisocyanate, hydrogenated xylylene diisocyanate, diphenylmethane diisocyanate and dibenzyl isocyanate; aliphatic polyisocyanates such as tetramethylene diisocyanate, hexamethylene diisocyanate, dicyclohexyl diisocyanate and isophorone diisocyanate. Polymers and biurets of these polyisocyanate compounds are also available. The above polyisocyanates may be used either singly or in combination of two or more.

The blocking agent used to block the above polyisocyanates includes, for example, a radically polymerizable monohydroxy compound. Concrete examples thereof include $C_2-C_6$ hydroxyalkyl (meth)acrylates such as hydroxyethyl (meth)acrylate and hydroxypropyl (meth)acrylate, tri- or tetra-propylene glycol mono(meth)acrylate, trimethylolpropane di(meth)acrylate and pentaerythritol tri(meth)acrylate.

The above polymerizable monohydroxy compound can be used together with other blocking agent. The other blocking agent includes saturated or unsaturated monoalcohols containing at least 6 carbon atoms, cellosolves, carbitols and oximes. Concrete examples thereof are saturated monoalcohols such as hexanol, nonanol, decanol, lauryl alcohol, stearyl alcohol and 2-ethylhexanol; unsaturated monoalcohols such as oleyl alcohol and linolenyl alcohol; cellosolves such as methyl cellosolve, ethyl cellosolve, butyl cellosolve and hexyl cellosolve; carbitols such as methyl carbitol, ethyl carbitol and butyl carbitol; and oximes such as methyl ethyl ketoxime and cyclohexanone oxime.

Polymerizable unsaturated monomer (f)

The polymerizable unsaturated monomer (f) having a vinylic double bond and a hydroxyl group can be the aforesaid examples of the unsaturated monomer (c) in the monomer component (A), for example, $C_2$-$C_6$ hydroxyalkyl (meth)acrylates such as 2-hydroxyethyl (meth)acrylate and 1-, 2- or 3-hydroxypropyl (meth)acrylate.

Other polymerizable unsaturated monomer (g)

The other polymerizable unsaturated monomer (g) is the rest of the monomer component (B) constituting the sheath component of the finely divided gelled polymer. Example of the monomer (g) can be, like examples of the polymerizable unsaturated monomer (d) in the monomer component (A), known monomers used to form ordinary acrylic resins, such as alkyl (meth)acrylate monomers, polymerizable unsaturated nitrile monomers, vinyl aromatic monomers and (meth)acrylic acid amide derivatives. They may be used either singly or in combination of two or more.

The proportions of the monomers (a) to (d) constituting the monomer component (A) [core component] of the finely divided gelled polymer (2) in this invention are not strictly limited and can be varied depending on the desirous properties of the finely divided gelled polymer. Generally, they can be within the following range.

| | |
|---|---|
| Monomer (a): | 0.5 to 10% by weight, preferably 1 to 8% by weight, more preferably 1.5-5% by weight |
| Monomer (b): | 1 to 50% by weight, preferably 3 to 40% by weight, more preferably 5-30% by weight |
| Monomer (c): | 1 to 30% by weight, preferably 2 to 20% by weight, more preferably 3-10% by weight |
| Monomer (d): | 10 to 97.5% by weight, preferably 32 to 94% by weight, more preferably 55-90.5% by weight |

The proportions of the monomers (e) to (g) constituting the monomer component (B) [sheath component] of the finely divided gelled polymer (2) are not strictly limited and can be varied depending on the desirous properties of the resulting finely divided gelled polymer. Generally, they can be within the following range.

| | |
|---|---|
| Monomer (e): | 10 to 40% by weight, preferably 15 to 35% by weight, more preferably 20-30% by weight |
| Monomer (f): | 1 to 30% by weight, preferably 2 to 20% by weight, more preferably 3-10% by weight |
| Monomer (g): | 30 to 89% by weight, preferably 45 to 83% by weight, more preferably 60-77% by weight |

It is also one of the important requirements in this invention to select the proportions of the monomer component (A) [core component] and the monomer component (B) [sheath component]. In this invention, it is advisable that the weight ratio [(A)/(B)] of the sum of the monomer component (A) to the sum of the monomer component (B) is usually 10/90 to 90/10, preferably 25/75 to 75/25, more preferably 40/60 to 60/40. If the (A)/(B) weight ratio is less than 10/90 or more than 90/10, the edge covering property of the resulting baked, coated film tends to decrease.

Water-soluble or water-dispersible cationic resin

As the water-soluble or water-dispersible cationic resin used in emulsion-polymerizing the monomer component (A) according to the present invention, there can be used a resin which is generally used as a film-forming resin in production of cationically electrodepositable paint. This resin has, in the molecule, a cationic functional group capable of imparting positive charges and hydrophilicity and, when neutralized with an acid, can form an electrodepositable aqueous bath at a cathode. Various types of resins are known as such a resin and all of them can be used in the present invention. Of them, preferable as a water-soluble or water-dispersible resin having excellent corrosion resistance is a reaction product obtained by reacting a polyphenol compound with epichlorohydrin to form a polyepoxide compound and then reacting the epoxy group of the polyepoxide compound with a cationizing agent.

Suitable as the above polyepoxide compound is a compound having at least two epoxy group

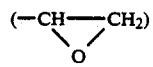

in the molecule and having a number-average molecular weight of generally 200 or more, preferably 400–2,000. As such a polyepoxide compound, there can be used those known per se, for example, a polyglycidyl ether of a polyphenol, which can be produced by reacting a polyphenol with epichlorohydrin in the presence of an alkali. The polyphenol includes, for example, bis(4-hydroxyphenyl)-2,2-propane, 4,4'-dihydroxybenzophenone, bis(4-hydroxyphenyl)-1,1-ethane, bis(4-hydroxytertbutylphenyl-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolac and cresol novolac.

Of the above-mentioned polyepoxide compounds, especially preferably for production of the water-soluble or water-dispersible cationic resin is a polyglycidyl ether of a polyphenol, having a number-average molecular weight of at least about 380, preferably about 800–2,000 and an epoxy equivalent of 190–2,000, preferably 400–1,000. a polyglycidyl ether of a polyphenol, represented by the following general formula is most preferable.

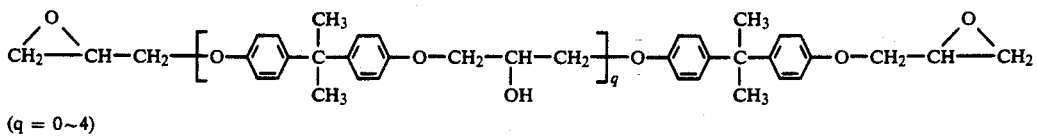

(q = 0~4)

The polyepoxide compound may partially be reacted with a polyol, a polyether polyol, a polyester polyol, a polyamideamine, a polycarboxylic acid, a polyisocyanate or the like, and may further be graft-polymerized with δ-caprolactone an acrylic monomer or the like.

Meanwhile, as the cationizing agent to be reacted with the polyepoxide compound, there can be mentioned aliphatic, alicyclic or aromatic-aliphatic primary or secondary amines, tertiary amine salts, secondary sulfide salts, tertiary phosphine salts, etc. These compounds react with an epoxy group to form a cationic group. It is also possible to react a tert-aminomonoisocyanate (obtained by the reaction of a tert-aminoalcohol with a diisocyanate) with the hydroxyl group of an epoxy resin to form a cationic group.

As examples of the amino compound as a cationizing agent, there can be mentioned the followings.

(1) Primary amines such as methylamine, ethylamine, n- or isopropylamine, monoethanolamine, n- or isopropanolamine and the like.

(2) Secondary amines such as diethylamine, diethanolamine, di-n- or di-isopropanolamine, N-methylethanolamine, N-ethylethanolamine and the like.

(3) Polyamines such as ethylenediamine, diethylenetriamine, hydroxyethylaminoethylamine, ethylaminoethylamine, methylaminopropylamine, dimethylaminoethylamine, dimethylaminopropylamine and the like Of these compounds, alkanolamines having a hydroxyl group are preferred. In the case of primary amino group, it is possible that the primary amino group be beforehand blocked by reaction with a ketone and then the remaining active hydrogen be reacted with an epoxy group.

Besides the above amine compounds, there can also be used basic compounds such as ammonia, hydroxylamine, hydrazine, hydroxyethylhydrazine, N-hydroxyethylimidazoline compound and the like, as a cationizing agent. The basic groups formed with these compounds can be protonated with an acid, especially preferably a water-soluble organic carboxylic acid (e.g. formic acid, acetic acid, lactic acid) to convert to a cationic group.

The content of the cationic group in the water-soluble or water-dispersible cationic resin used in the present invention, is desirably as low as possible as long as the cationic resin can be stably dispersed in water, and is generally 3–100, particularly 10–80, more particularly 30–60 in terms of KOH mg/g of solids content. Even if the content of the cationic group is less than 3, the cationic resin is made water-dispersible by using a surface active agent or the like and can be used; in this case, however, it is desirable that the cationic group of the cationic resin be controlled so that the aqueous dispersion of the cationic resin gives a pH of 4–9, preferably 6–7.

The desirable amount of the water-soluble or water-dispersible cationic resin used is generally 1–100 parts by weight, preferably 3–50 parts by weight, more preferably 5–30 parts by weight per 100 parts by weight of the solids content of the finely divided gelled polymer.

Preparation of finely divided gelled polymers (1) and (2)

The finely divided gelled polymer (1) can be produced by polymerizing the above-mentioned monomer component (A) comprising the monomers (a) to (d), in the presence of the water-soluble or water-dispersible cationic resin in the presence of a polymerization initiator according to a per se known emulsion polymerization method.

The finely divided gelled polymer (2) can be produced by polymerizing the above-mentioned monomer component (B) comprising the monomers (e) to (g), in the presence of the above-produced finely divided gelled polymer (1) in the presence of a polymerization initiator according to a per se known emulsion polymerization method.

As the polymerization initiator used in the production of the finely divided gelled polymers (1) and (2), there can be used any polymerization initiator ordinarily used in the production of an acrylic (co)polymer by emulsion polymerization; in the present invention, however, a water-soluble azoamide compound is preferable.

Especially preferably as the polymerization initiator is a water-soluble azoamide compound represented by formula (I) or (II),

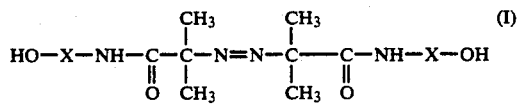

wherein X denotes a linear or branched alkylene group with 2 to 12 carbon atoms, or

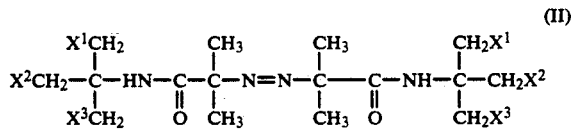

wherein at least one of $X^1$, $X^2$ and $X^3$ denotes a hydroxyl group and the others denote hydrogen. These compounds are known per se (refer to e.g. Japanese Laid-Open Patent Application No. 218,618/1986 and No. 63,643/1986). For example, a polymerization initiator commercially available under the tradename "VA Series" of Wako Pure Chemical Ind., Ltd. is taken. The polymerization initiator can be used in an amount commonly employed in said technical field. It is usually 0.1 to 1.5 parts by weight, preferably 0.5 to 1.5 parts by weight per 100 parts by weight of the solids content of the finely divided gelled polymer.

Copolymerization of the monomer component (A) or (B) can be conducted by an emulsion polymerization method known per se for producing an acrylic polymer. For example, the mixture [monomer component (A)] of the above monomers (a) to (d), is reacted usually at a reaction temperature of about 50° to about 100° C. for about 1 to about 20 hours in an aqueous medium in the presence of a water-soluble or water-dispersible cationic resin and a water-soluble azoamide compound as a reaction initiator to form an a cationically electrodepositable finely divided gelled polymer (1).

When a finely divided gelled polymer (2) having a core-sheath structure is obtained, the mixture [monomer component (B)] of the monomers (e) to (g) is added to the polymerization product above and the reaction further continues at a reaction temperature of about 50° to about 100° C. for about 1 to about 20 hours. There can be obtained a cationically electrodepositable finely divided gelled polymer (2) having a core-sheath structure in this invention.

The aqueous dispersion of the cationically electrodepositable finely divided gelled polymer (1) or (2) in this invention has usually the resin solids content about 10 to 40% by weight based on the total weight. The finely divided gelled polymer can have a particle size of usually 500 nm or less, preferably 10 to 300 nm, more preferably 50 to 100 nm. The particle size can be adjusted by adjusting the amount of the water-soluble or water-dispersible cationic resin, and a finely divided gelled polymer having a desirable particle size readily be obtained.

The cationically electrodepositable finely divided gelled polymer (1) or (2) of this invention can be added to an ordinary cationically electro-depositable paint. On this occasion, the finely divided gelled polymer is electrodeposited without posing problems of coagulation, abnormal electrodeposition and sedimentation. Said finely divided gelled polymer acts as a rheology-controlling agent when heat-curing the electro-deposition coated film, exhibiting an excellent effect of prevention of cissing and an excellent effect of an edge covering effect. Moreover, the coated film formed from the cationically electrodepositable paint containing the finely divided gelled polymer of this invention forms a microseparating structure, and the properties of the coated film are greatly improved.

The following Preparation Examples, Examples, Comparative Examples and Application Examples illustrate this invention specifically. In said Examples, "parts" and "%" are all by weight.

Preparation of water-dispersible cationic resins

Preparation Example 1

1,900 parts of a bisphenol A type epoxy resin [Epikote 1004 (trade name) manufactured by Shell Chemical Co.] having an epoxy equivalent of 950 was dissolved in 993 parts of butyl cellosolve. Thereto was dropwise added 210 parts of diethanolamine at 80°-100° C. The mixture was kept at 100° C. for 2 hours to obtain an epoxy resin-amine adduct having a solids content of 68% and an amine value of 53. 100 parts of this resin was mixed with 3.7 parts of acetic acid to effect neutralization. Thereto was added 123 parts of deionized water to obtain an aqueous dispersion of a water-dispersible cationic resin, having a solids content of 30%.

Preparation Example 2

39 parts of monoethanolamine was kept at 60° C. in a reactor. Thereto was dropwise added 100 parts of N,N-dimethylaminopropylacrylamide. The resulting mixture was subjected to a reaction at 60° C. for 5 hours to obtain a N,N-dimethylaminopropylacrylamide-monoethanolamine adduct.

Separately, there were fed 950 parts of bisphenol A diglycidyl ether having an epoxy equivalent of 190, about 340 parts of propylene glycol diglycidyl ether having an epoxy equivalent of about 340, 456 parts of bisphenol A and 21 parts of diethanolamine. The mixture was heated to 120° C. and subjected to a reaction until an epoxy value of 1.02 millimoles/g was obtained. The reaction mixture was diluted with 479 parts of ethylene glycol monobutyl ether and cooled. While the temperature of the reaction mixture was kept at 100° C., the reaction mixture was mixed with 158 parts of diethanolamine and 43 parts of the above-prepared N,N-dimethylaminopropylacrylamidemonoethanolamine adduct. The resulting mixture was subjected to a reaction until there was no viscosity increase, to obtain a resin having a solids content of 80%. 100 parts of this resin was mixed with 4.3 parts of acetic acid to effect neutralization. Thereto was added 162.4 parts of deionized water to obtain an aqueous dispersion of a water-dispersible cationic resin, having a solids content of 30%.

Preparation of radically polymerizable blocked isocyanate monomer

Preparation Example 3

222 parts of isophorone diisocyanate and 47 parts of methyl isobutyl ketone were fed into a 2-liter flask provided with a stirrer, an air-introducing tube, a cooling tube and a temperature-controlling device. The mixture was stirred while dry air was blown thereinto, to heat the mixture to 70° C. Thereto was added 0.3 part of dibutyltin dilaurate. Then, 116 parts of 2-hydroxyethyl acrylate was dropwise added in 1 hour. After the completion of the dropwise addition, the mixture was kept at 70° C. for 1 hour. Subsequently, 87 parts of methyl ethyl ketoxime was dropwise added in 1 hour. After the completion of the dropwise addition, the mixture was kept at 70° C. by heating and sampling was made with the lapse of time to examine the absorption of -NCO by IR. The timing when the absorption of -NCO disappeared, was taken as the end point of reaction. Thus, there was obtained a 90% isophorone diisocyanate/2-hydroxyethyl acrylate/methyl ethyl ketoxime blocked form solution. The 70% solids content bubble viscosity (solvent composition: methyl isobutyl ketone=10%, n-butyl acrylate =20%) of the solution was G+.

EXAMPLE 1

2,920.5 parts of deionized water and 667 parts of the aqueous dispersion of a water-dispersible cationic resin, having a solids content of 30% obtained in Preparation Example 1 were fed into a 1-liter flask provided with a stirrer, a thermometer, a cooling tube and a heating mantle. The mixture was heated to 90° C. with stirring. Thereto was added 20% of an aqueous solution obtained by dissolving, in 500 parts of deionized water, 12.5 parts of a polymerization initiator which was 2,2'-azobis[2-methyl-N-(2-hydroxyethyl)]propionamide (VA-086 manufactured by Wako Pure Chemical Ind., Ltd.). 15 minutes later, 5% of the following monomer mixture was added.

| | |
|---|---|
| Styrene | 430 parts |
| n-Butyl acrylate | 440 parts |
| 1,6-Hexanediol diacrylate | 40 parts |
| 2-Hydroxyethyl acrylate | 40 parts |
| KBM-503 (γ-methacryloxypropyltrimethoxysilane manufactured by Shin-Etsu Chemical Co., Ltd.) | 50 parts |

Stirring was made for a further 30 minutes. Then, the dropwise addition of the remainders of the monomer mixture and the aqueous solution of polymerization initiator was started. The monomer mixture was added in 3 hours and the aqueous solution of polymerization initiator was added in 3.5 hours. The polymerization temperature was kept at 90° C. After the completion of the aqueous solution of polymerization initiator, the polymerization temperature was kept at 90° C. for 30 minutes by heating and then lowered to room temperature by cooling. The reaction mixture was filtered through a filter cloth. Thus, there was obtained a finely divided gelled polymer having a solids content of 23.5%, a pH of 4.6, a viscosity of 25 cp (measured by a BM type rotational viscometer using a No. 2 spindle) and an average particle diameter of 61 nm (measured by Nanosizer N-4 manufactured by Coulter Co.).

EXAMPLE 2

Emulsion polymerization was conducted in the same manner as in Example 1 except that the polymerization initiator was changed to 2,2'-azobis(2-methyl-N-[1,1'-bis(hydroxymethyl)-2-hydroxyethyl]propionamide (VA-080 manufactured by Wako Pure Chemical Ind., Ltd.), to obtain a finely divided gelled polymer having a solids content of 23.6%, a pH of 4.7, a viscosity of 30 cp and an average particle diameter of 65 nm.

EXAMPLE 3

Emulsion polymerization was conducted in the same manner as in Example 1 except that the aqueous dispersion of water-dispersible cationic resin was changed to that obtained in Preparation Example 2, to obtain a finely divided gelled polymer having a solids content of 23.5%, a pH of 5.0, a viscosity of 40 cp and an average particle diameter of 70 nm.

EXAMPLE 4

583 parts of deionized water and 133 parts of the aqueous dispersion of a water-dispersible cationic resin, having a solids content of 30% obtained in Preparation Example 1 were fed into a 1-liter flask provided with a stirrer, a thermometer, a cooling tube and a heating mantle. The mixture was heated to 90° C. with stirring. Thereto was added 20% of an aqueous solution obtained by dissolving, in 100 parts of deionized water, 2 parts of a polymerization initiator which was 2,2-azobis[2-methyl-N-(2-hydroxyethyl)]propionamide (VA-086 manufactured by Wako Pure Chemical Ind., Ltd.). 15 minutes later, 10% of the following monomer mixture [component (A)] was added.

| | |
|---|---|
| Styrene | 32 parts |
| n-Butyl acrylate | 32 parts |
| 1,6-Hexanediol diacrylate | 30 parts |
| 2-Hydroxyethyl acrylate | 4 parts |
| KBM-503 (γ-methacryloxypropyltrimethoxysilane manufactured by Shin-Etsu Chemical Co., Ltd.) | 2 parts |

Stirring was made for a further 30 minutes. Then, the dropwise addition of the remainders of the component (A) monomer mixture and the aqueous solution of polymerization initiator was started. The component (A) monomer mixture was added in 1.5 hours and the aqueous solution of polymerization initiator was added in 4.5 hours. After the completion of the dropwise addition of the component (A) monomer mixture, the polymerization temperature was kept at 90° C. for 1 hour. Then, the dropwise addition of the following monomer mixture [component (B)] was started.

| | |
|---|---|
| Styrene | 38 parts |
| n-Butyl acrylate | 38 parts |
| 2-Hydroxyethyl acrylate | 4 parts |
| Monomer solution obtained in Preparation Example 3 | 22 parts |

The component (B) monomer mixture was fed in 1.5 hours. After the completion of the dropwise addition of the aqueous solution of polymerization initiator, the polymerization temperature was kept at 90° C. for 30 minutes by heating and then lowered to room temperature by cooling. Filtration by filter cloth was conducted. Thus, there was obtained a dispersion of a finely divided gelled polymer, having a solids content of 23.5%, a pH of 4.6, a viscosity of 30 cp (measured by a BM type rotational viscometer using a No. 2 spindle) and an average particle diameter of 70 nm (measured by Nanosizer N-4 manufactured by Coulter Co.).

EXAMPLE 5

Emulsion polymerization was conducted in the same manner as in Example 4 except that the aqueous dispersion of water-dispersible cationic resin was changed to that obtained in Preparation Example 2, to obtain a dispersion of a finely divided gelled polymer, having a solids content of 23.4%, a pH of 4.7, a viscosity of 35 cp and an average particle diameter of 75 nm.

EXAMPLE 6

Emulsion polymerization was conducted in the same manner as in Example 4 except that the polymerization initiator was changed to 2,2'-azobis(2-methyl-N-[1,1'-bis(hydroxymethyl)-2-hydroxyethyl]propionamide (VA-080 manufactured by Wako Pure Chemical Ind., Ltd.), to obtain a dispersion of a finely divided gelled polymer, having a solids content of 23.6%, a pH of 4.6, a viscosity of 35 cp and an average particle diameter of 73 nm.

COMPARATIVE EXAMPLE 1

3,507.5 parts of deionized water and 80 parts of Ratemuru K-180 (an aqueous solution containing 25% of an Allyl group-containing cationic reactive emulsifier of quaternary ammonium salt type, manufactured by Kao Corp.) were fed into a 1-liter flask provided with a stirrer, a thermometer, a cooling tube and a heating mantle. The resulting mixture was heated to 90° C. with stirring. Thereto was added 20% of an aqueous solution obtained by dissolving 12.5 parts of VA-086 (a polymerization initiator) in 500 parts of deionized water. 15 minutes later, 5% of the following monomer mixture was added.

| | |
|---|---|
| Styrene | 430 parts |
| n-Butyl acrylate | 440 parts |
| 1,6-Hexanediol diacrylate | 40 parts |
| 2-Hydroxyethyl acrylate | 40 parts |
| KBM-503 | 50 parts |

Stirring was conducted for a further 30 minutes. Then, the dropwise addition of the remainders of the monomer mixture and the aqueous solution of polymerization initiator was started. The monomer mixture was added in 3 hours and the aqueous solution of polymerization initiator was added in 3.5 hours. The polymerization temperature was kept at 90° C. After the completion of the dropwise addition of the aqueous solution of polymerization initiator, the polymerization temperature was kept at 90° C. for 30 minutes by heating and lowered to room temperature by cooling. Filtering by filter cloth was conducted to obtain a finely divided gelled polymer having a solids content of 20%, a pH of 3.7, viscosity of 90 cp and an average particle diameter of 71 nm.

COMPARATIVE EXAMPLE 2

Emulsion polymerization was conducted in the same manner as in Comparative Example 1 except that the polymerization initiator was changed to VA-080, o obtain a finely divided gelled polymer having a solids content of 19.9%, a pH of 3.7, a viscosity of 25 cp and an average particle diameter of 72 nm.

COMPARATIVE EXAMPLE 3

Emulsion polymerization was conducted in the same manner as in Example 4 except that the amount of deionized water initially fed was changed to 700 parts and the water-dispersible cationic resin was replaced by 16 parts of Ratemuru K-180 (an aqueous solution containing 25% of an allyl group-containing cationic reactive emulsifier of quaternary ammonium salt type, manufactured by Kao Corp.), to obtain a dispersion of a finely divided gelled polymer, having a solids content of 19.9%, a pH of 3.7, viscosity of 25 cp and an average particle diameter of 72 nm.

COMPARATIVE EXAMPLE 4

Emulsion polymerization was conducted in the same manner as in Comparative Example 3 except that the polymerization initiator was changed to VA-080, to obtain a dispersion of a finely divided gelled polymer, having a solids content of 20.0%, a pH of 3.6, a viscosity of 40 cp and an average particle diameter of 74 nm.

APPLICATION EXAMPLE 1

75 parts of the finely divided gelled polymer having the solids content of 20% which was obtained in Example 1 and 139.4 parts of a pigment paste having a solids content of 43% which was shown in Table 1 were added with stirring to 572 parts of a clear emulsion for cationic electrodeposition ("Electron 9450, a tradename for a product of Kansai Paint Co., Ltd.) comprising a polyamide-modified epoxy resin and a completed blocked diisocyanate and having a solids content of 35%, and diluted with 588.5 parts of deionized water to obtain a cationically electrodepositable paint.

TABLE 1

|  | Pigment paste |
| --- | --- |
| Modified epoxy resin | 5 |
| Titanium oxide | 14 |
| Purified clay | 10 |
| Carbon black | 1 |
| Deionized water | 39.7 |
| Total | 69.7 |

APPLICATION EXAMPLES 2 TO 10

A cationically electrodepositable paint was obtained as in Application Example 1 except using 75 parts of each of the dispersions obtained in Examples 2 to 6 and Comparative Examples 1 to 4 as a finely divided gelled polymer.

In each of the cationically electrodepositable paints obtained in Application Examples 1 to 10 was dipped a 0.8×300×90 mm cold-rolled dull steel plate (an angle between an edge surface and a flat portion was 45°) chemically treated with "Palbond 3030" (a tradename for a product of Nihon Parkerizing Co., Ltd., a zinc phosphate-type), and electrodeposition-coating was conducted using the above plate as a cathode. The conditions of the electrodeposition-coating were that the temperature of an electrodeposition paint bath was 30° C., pH 6.5 and a voltage 300 V, respectively. An electro-deposition-coated film having a thickness of 20 microns (based on a dry film thickness) was formed, then washed with water and baked at 185° C. for 20 minutes. The results of properties measured for this coated plate are shown in Table 2. The results of melt viscosities of the coated films are also shown in Table 2.

The cationically electrodepositable paints obtained in Application Examples 1 to 10 were stored for 1 month while being sealed and stirred at 30° C., and also subjected to the above electrodeposition test. The results are also shown in Table 2.

Methods for measuring properties (*1) Melt viscosity of coated film

The melt viscosity of a electrodeposition-coated film in baking is evaluated from the heat flow appearance of a pencil scratch based on the melt viscosity by a measuring method using a rolling ball (according to JIS-Z-0237). The value is a minimum viscosity (centipoises).

(*2) Edge covering property

Electrodeposition-coating is conducted on a steel plate having an edge angle of 45° under such conditions that the thickness of a coated film in a flat portion becomes 20 microns, and the coated steel plate is cured under given baking conditions to produce a test plate. The test plate is put on a salt spray device such that the edge of the test plate is vertical, and a salt spray test is then continued for 168 hours in accordance with JIS-S-2371. Corrosion resistance of the edge portion after 168 hours is evaluated as follows.
 ⊚: Rust does not occur at all.
 ○: Rust slightly occurs.
 ×: Rust heavily occurs.

(*3) Smoothness of coated surface

The finishing property of a electrodeposition-coated surface is evaluated by visual observation.
 ○: Good
 ⊚: Nearly good
 Δ: Slightly bad (*4) Impact resistance The impact resistance is measured in an atmosphere of 20° C. according to JIS-K-5400-1979 6, 13, 3B. The value is a maximum height (cm) that does not cause a damage of the coated film under such conditions that the dropped weight is 500 g and the diameter of the end of the impact center is ½ inch. The maximum value is 50 cm.

(*5) Chipping resistance

A electrodeposition-coated, backed plate is further coated with a thermosetting intermediate coat and a topcoat, and heat-cured. The resulting plate is subjected to the following test.

1) Test device: Q-G-R gravelometer (a device of Q Panel Company)
2) Stones to be air-blasted: ground stone having a diameter of 15 to 20 mm
3) Volume of stone to be air-blasted: about 500 ml
4) Pressure of blasting air: about 4 kg/cm$^2$
5) Temperature in test: about 20° C.

A test piece is fixed on a test piece holding base, and about 500 ml of ground stones are shot against the test piece at a blasting air pressure of about 4 kg/cm$^2$. The condition of the coated surface is then evaluated. The condition of the coated surface is evaluated visual observation according to the following standard.

⊚ (good): A flaw due to shooting is slightly observed on part of the topcoat, and the electrodeposition-coated film is slightly peeled off.
◉ (slightly bad): A flaw due to shooting is observed on the topcoat and the intermediate coat, and the electrodeposition-coated film is slightly peeled off.
Δ (bad): A flaw due to shooting is heavily observed on the topcoat and the intermediate coat and the electrodeposition-coated film is notably peeled off.

(*6) Adhesion after dipping in hot water

After dipping in water of 40° C. for 20 days, crosscut is applied to a coated film according to JIS-K-5400-1979 6.15, and an adhesive cellophane tape is put on the surface. Said tape is abruptly peeled off and the condition of the coated surface is evaluated.
⊙: Good
Δ: An edge of the crosscut is slightly peeled off.
×: Part of the crosscut is peeled off.

(*7) Corrosion resistance

A crosscut flaw is formed into a electrode-position coated film with a knife until it reaches a base. The resulting coated film is subjected to a salt spray test for 840 hours according to JIS Z2371. Corrosion resistance is evaluated from the width of the rust of blister generated from the knife flaw.
○: The maximum width of rust of blister is less than 1 mm (one side) from the crosscut portion.
◉: The maximum width of rust or blister is not less than 1 mm but less than 2 mm (one side) from the crosscut portion.
Δ: The maximum width of rust or blister is not less than 2 mm but less than 3 mm (one side) from the crosscut portion and the flat portion is notably blistered.
×: The maximum width of rust or blister is not less than 3 mm from the crosscut portion, and blister is observed on the overall surface of the film.

(*8) Corrosion resistance in wet condition

A crosscut flaw is formed into an electro-deposition coated film with a knife until it reaches a base. The resulting film is immersed in a 5% aqueous sodium chloride solution kept at 50° C., for 840 hours. Then, the width of the rust or blister generated from the crosscut flaw is measured to evaluate the corrosion resistance in wet condition, of the film.
○: The maximum width of rust or blister is less than 1 mm (one side) from the crosscut portion.
◉: The maximum width of rust or blister is not less than 1 mm but less than 2 mm (one side) from the crosscut portion.
Δ: The maximum width of rust or blister is not less than 2 mm but less than 3 mm (one side) from the crosscut portion and the flat portion is notably blistered.
×: The maximum width of rust or blister is not less than 3 mm from the crosscut portion, and blister is observed on the overall surface of the film.

TABLE 2

| | | | Application Examples | | | | | | | | | |
|---|---|---|---|---|---|---|---|---|---|---|---|---|
| | | | 1 | 2 | 3 | 4 | 5 | 6 | 7 | 8 | 9 | 10 |
| | | | Types of dispersions used | | | | | | | | | |
| Test items | | | Example 1 | Example 2 | Example 3 | Example 4 | Example 5 | Example 6 | Comparative Example 1 | Comparative Example 2 | Comparative Example 3 | Comparative Example 4 |
| Melt viscosity of coated film | (*1) | Initial | $10^6$ | $10^6$ | $10^6$ | $10^6$ | $10^6$ | $10^6$ | $10^6$ | $10^6$ | $10^6$ | $10^6$ |
| | | After one month at 30° C. | $10^6$ | $10^6$ | $10^6$ | $10^6$ | $10^6$ | $10^6$ | $10^5$ | $10^5$ | $10^6$ | $10^6$ |
| Edge covering property | (2*) | Initial | ⊚ | ⊚ | ⊚ | ⊚ | ⊚ | ⊚ | ⊚ | ⊚ | ⊚ | ⊚ |
| | | After one month at 30° C. | ⊚ | ⊚ | ⊚ | ⊚ | ⊚ | ⊚ | ○ | ○ | ⊚ | ⊚ |
| Smoothness of coated surface | (*3) | Initial | ○ | ○ | ○ | ○ | ○ | ○ | Δ | Δ | ○ | ○ |
| | | After one month at 30° C. | | | | | | | | | | |
| Impact resistance | (*4) | Initial | 50 | 50 | 50 | 50 | 50 | 50 | 50 | 50 | 50 | 50 |
| | | After one month at 30° C. | 50 | 50 | 50 | 50 | 50 | 50 | 40 | 40 | 50 | 50 |
| Chipping resistance | (*5) | Initial | ⊚ | ⊚ | ⊚ | ⊚ | ⊚ | ⊚ | ⊚ | ⊚ | ⊚ | ⊚ |
| | | After one month at 30° C. | ⊚ | ⊚ | ⊚ | ⊚ | ⊚ | ⊚ | ○ | ○ | ⊚ | ⊚ |
| Adhesion after dipping in hot water | (*6) | Initial | ⊚ | ⊚ | ⊚ | ⊚ | ⊚ | ⊚ | ⊚ | ⊚ | ⊚ | ⊚ |
| | | After one month at 30° C. | ⊚ | ⊚ | ⊚ | ⊚ | ⊚ | ⊚ | ○ | ○ | ⊚ | ⊚ |

TABLE 2-continued

| | | | Application Examples | | | | | | | | | |
|---|---|---|---|---|---|---|---|---|---|---|---|---|
| | | | 1 | 2 | 3 | 4 | 5 | 6 | 7 | 8 | 9 | 10 |
| | | | \multicolumn{10}{c}{Types of dispersions used} | | | | | | | |
| Test items | | | Example 1 | Example 2 | Example 3 | Example 4 | Example 5 | Example 6 | Comparative Example 1 | Comparative Example 2 | Comparative Example 3 | Comparative Example 4 |
| Corrosion resistance | (*7) | Initial | ○ | ○ | ○ | ○ | ○ | ○ | ○ | ○ | ○ | ○ |
| | | After one month at 30° C. | ○ | ○ | ○ | ○ | ○ | ○ | △ | △ | ○ | ○ |
| Corrosion resistance in wet condition | (*8) | Initial | ○ | ○ | ○ | ○ | ○ | ○ | △ | △ | △ | △ |
| | | After one month at 30° C. | ⊚ | ⊚ | ⊚ | ○ | ○ | ○ | △ | △ | △ | △ |

What is claimed is:

1. A cationically electrodepositable finely divided gelled polymer obtained by, in the first step, emulsion-polymerizing, in the presence of a water-soluble or water-dispersible cationic resin which is a reaction product obtained by reacting a polyphenol compound with epichlorohydrin and then reacting the epoxy group of the resulting polyepoxide compound with a cationic agent selected from the group consisting of aliphatic, alicyclic or aromatic aliphatic primary or secondary amines, tertiary amines, secondary sulfide salts and tertiary phosphate salts, a monomer component (A) comprising (a) a polymerizable unsaturated vinylsilane monomer having a vinylic double bond and a hydrolyzable alkoxysilane group and represented by the formula (R)$_3$SIQ wherein Q denotes a polymerizable unsaturated group selected from a gamma-methacryloxypropyl group and a vinyl group, and R denotes an acetoxy group or an alkoxy group having 1 to 8 carbon atoms, (b) a polymerizable monomer having at least two radically polymerizable unsaturated groups in the molecule and being selected from a polymerizable unsaturated monocarboxylic acid ester of a polyhydric alcohol, a polymerizable unsaturated alcohol ester of a polybasic acid, and an aromatic compound substituted with two or more vinyl groups, (c) a polymerizable unsaturated monomer having a vinylic double bond and a hydroxyl group, and (d) another polymerizable unsaturated monomer, the monomer compound (A) comprising
the monomer (a) 0.5 to 10% by weight,
the monomer (b) 1 to 50% by weight,
the monomer (c) 1 to 30% by weight, and
the monomer (d) 10 to 97.5% by weight,
and then, in the second step, emulsion-polymerizing, in the presence of the aqueous finely divided gelled polymer obtained in the first step, a monomer component (B) comprising (e) a blocked mono- or polyisocyanate in which the at least one isocyanate group in the molecule is blocked with a radically polymerizable monohydroxy compound, (f) a polymerizable unsaturated monomer having a vinyl double bond and a hydroxyl group, and (g) another polymerizable unsaturated monomer, the monomer component (B) comprising
the monomer (e) 10 to 40% by weight,
the monomer (f) 1 to 40% by weight, and
the monomer (g) 30 to 89% by weight,
said cationically electrodepositable finely divided gelled polymer having a core-sheath structure consisting of a core of the polymerization product of the monomer component (A) and a sheath of the polymerization product of the monomer component (B).

2. The cationically electrodepositable finely divided gelled polymer of claim 1 wherein the monomer (a) is at least one type selected from vinyltrimethoxysilane, vinyltriethoxysilane, vinyltris(2-methoxyethoxy)silane, gamma-methacryloxypropyltrimethoxysilane and vinyltriacetoxysilane.

3. The cationically electrodepositable finely divided gelled polymer of claim 1 wherein the monomer (c) is at least one type selected from 2-hydroxyethyl (meth)acrylate and hydroxypropyl (meth)acrylate.

4. The cationically electrodepositable finely divided gelled polymer of claim 1 wherein the monomer (d) is at least one type selected from an alkyl (meth)acrylate monomer, a polymerizable unsaturated nitrile monomer and a vinyl aromatic monomer.

5. The cationically electrodepositable finely divided gelled polymer of claim 1 wherein the monomer (e) is a blocked monoisocyanate in which the monoisocyanate is blocked with a radically polymerizable monohydroxy compound.

6. The cationically electrodepositable finely divided gelled polymer of claim 1 wherein the monomer (e) is a blocked polyisocyanate in which the at least one isocyanate group of the polyisocyanate is blocked with a radically polymerizable monohydroxy compound.

7. The cationically electrodepositable finely divided gelled polymer of claim 1 wherein the monomer (f) is at least one type selected from 2-hydroxyethyl (meth)acrylate and hydroxypropyl (meth)acrylate.

8. The cationically electrodepositable finely divided gelled polymer of claim 1 wherein the monomer (g) is at least one type selected from an alkyl (meth)acrylate monomer, a polymerizable unsaturated nitrile monomer and a polymerizable vinyl aromatic monomer.

9. The cationically electrodepositable finely divided gelled polymer of claim 1 wherein the monomer component (A)/monomer component (B) weight ratio is within the range of 10/90 to 90/10.

10. The cationically electrodepositable finely divided gelled polymer of claim 1 wherein the amount of the water-soluble or water-dispersible cationic resin is 1-100 parts by weight per 100 parts by weight of the solids content of the cationically electrodepositable finely divided gelled polymer.

11. A cationically electrodepositable paint containing the finely divided polymer of claim 1.

* * * * *